United States Patent Office 3,148,583
Patented Sept. 15, 1964

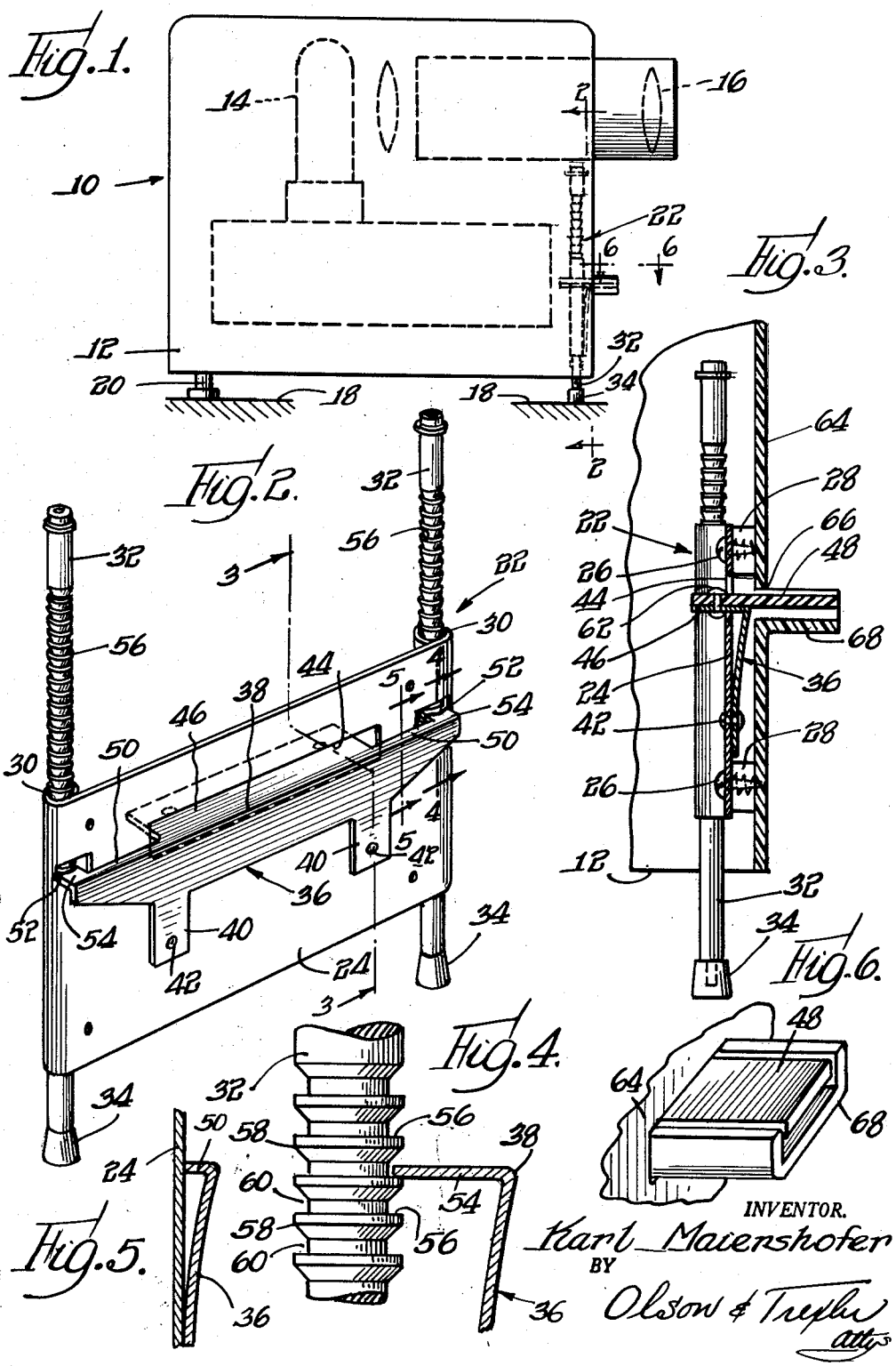

3,148,583
PROJECTOR
Karl Maiershofer, Park Ridge, Ill., assignor to G-M Laboratories Inc., Chicago, Ill., a corporation of Illinois
Filed Apr. 25, 1961, Ser. No. 105,489
3 Claims. (Cl. 88—24)

The present invention relates to portable projectors used to project picture slides and moving pictures onto viewing screens, and is concerned particularly with the adjustment of such projectors to effect the desired registration of a projected image with a viewing screen.

One object of the invention is to provide a portable picture projector of the above character having a new and improved construction which affords substantial economy in the manufacture of the projector, while at the same time providing significant functional advantages in the use of the projector.

Another object is to provide a portable picture projector having an improved construction which affords a steady rigid support to the projector, while at the same time providing for ready adjustment of the position of the projector by a remarkably simple operating movement to effect optimum alinement of a projected image with a screen, the projector being rigidly supported firmly in each position to which it is adjusted.

Another object is to provide an improved projector of the above character which is supported steadily yet adjustably by support means including two laterally spaced support elements which respond to actuation of a single release element to automatically seek proper positions of vertical adjustment in relation to the projector in which the support elements are positively locked against vertical displacement relative to the projector by the interfering relation to each other of positive abutment surfaces of coacting detent abutments.

Another object is to provide a picture projector incorporating adjustable support means of extremely simple construction which provides for remarkably easy adjustment of the working position of the projector while serving to positively lock the projector supporting structure in any position of adjustment without binding of the coacting parts on each other.

Another object is to provide a picture projector of the above character which is well adapted for mass production for amateur use by virtue of highly simplified adjustable support structure inherently well adapted for most economical manufacture and providing in use for easy adjustment of the projector to a desired position in which it is rigidly supported by the simple support structure.

Another object is to provide an improved projector as recited in the previous objects incorporating improved adjustable support structure which supports the projector by means of a positive locking action which is not diminished in its effectiveness by prolonged usage of the projector.

Other objects and advantages will become apparent from the following description of the exemplary embodiment of the invention illustrated in the drawings, in which:

FIGURE 1 is a side elevational view of a projector forming the exemplary embodiment of the invention illustrated;

FIG. 2 is a perspective view of support structure for the forward end of the projector, taken generally with reference to the line 2—2 of FIG. 1;

FIG. 3 is a fragmentary vertical sectional view of the projector taken generally with reference to the line 3—3 of FIG. 2, and showing coacting portions of the projector housing;

FIG. 4 is a detail sectional view taken with reference to the line 4—4 of FIG. 2, with certain parts being eliminated for clearness in illustration;

FIG. 5 is a fragmentary sectional view taken with reference to the line 5—5 of FIG. 2; and FIG. 6 is a perspective view of projector positioning structure taken with reference to the line 6—6 of FIG. 1.

Referring to the drawings in greater detail, the portable projector 10 forming the exemplary embodiment of the invention illustrated comprises a projector housing or base 12 supporting a projector lamp 14, and a projector lens 16.

In use, the projector 10 is supported on the surface 18 of a suitable support table or the like. Support for the rear end of the projector is provided by rear feet or support elements 20 extending downwardly from the rear portion of the housing or base 12, as shown in FIG. 1.

The forward end of the projector is supported on an underlying surface 18 by means of adjustable support structure 22 which provides, as will presently appear, for tilting of the projector to any desired angular position of adjustment to effect alinement of the picture image projected by the projector with a viewing screen (not shown).

The adjustable projector supporting means 22 which provides, as will presently appear, for ready tipping of the projector to any desired position of adjustment and for rigid support of the projector in any position of adjustment, has a highly simplified construction which is inherently well adapted for exceptionally economical manufacture.

As illustrated in the drawings, the adjustable support means 22 comprises a transverse support plate 24 mounted in a generally vertical position within the forward portion of the housing 12. In the present instance, the housing 12 is formed of a suitable plastic material and the support plate 24 is attached by threaded elements 26 to supporting abutments 28 formed on the housing. See FIG. 3.

Opposite ends of the support plate 24 which is formed from sheet metal are curled back along the plate to define a pair of generally cylindrical guide sleeves 30 located at opposite ends of the plate and occupying generally vertical positions.

The two sleeves 30 receive a pair of adjustable support elements 32 comprising generally cylindrical support rods or standards slidably disposed within the respective sleeves and projecting downwardly below the housing 12 to support the forward end of the housing. Cushioned feet elements 34 on the lower end of the elongated support elements 32 are adapted to rest on an underlying support surface, such as the table surface 18 previously mentioned.

The two support elements 32, which are freely and independently adjustable within the guide sleeves 30, are normally locked releasably yet positively in their respective positions of adjustment by means of a common cantilevering detent plate 36 formed as a single stamping from sheet metal tempered to have the resilient characteristics of spring metal.

The detent plate 36 is horizontally elongated to span both of the adjustable support elements 32 and is shaped by a single, substantially right-angle bend 38 extending along the full horizontal length of the plate to have an inverted L-shape as viewed from one end, FIGS. 2, 3 and 4.

Two horizontally spaced support tangs 40, integrally formed on the plate 36 and extending downwardly from the lower edge of the main body of the plate, are fixedly secured to the support plate 24 by rivets 42 to provide resilient cantilevering support for the detent plate 36 on the support plate 24.

As shaped by the generally right-angle bend 38 previously referred to, the detent plate 36 comprises a generally vertical portion extending downwardly from the bend 38 and providing a cantilevering support to a generally horizontal portion of the plate which extends from the bend 38 in the direction of the support plate 24. In this connection, it will be observed with reference to the drawings that the bend 38 and the downwardly extending, generally vertical portion of the plate 36 are located on the side of the support plate 24 opposite from the guides 30 defined by the curled ends of the support plate.

As best shown in FIGS. 1 and 3, a medial section of the horizontally extending upper portion of the detent plate 36 projects through a horizontal slot 44 in the support plate 24 to extend beyond the opposite side of the support plate to provide a flat anchor 46 for a control tab or detent release actuator 48 to be described presently in greater detail.

As secured to the support plate 24 by the rivets 42, the generally vertical portion of the detent plate 36 tends to urge the bend 38 in the detent plate into contiguous relation to the adjacent face of the support plate. However, movement of the upper extremity of the generally vertical portion of the cantilever plate 36 toward the support plate 24 is positively limited to provide a residual bending stress in the vertical portion of the plate which provides cantilevering support to the horizontal portion of the detent plate.

For this purpose, the horizontally extending segment or portion of the detent plate is shaped to define two abutments or limit stops 50 located beyond opposite ends of the actuator anchoring element 46 and adapted to abuttingly engage the adjacent face of the support plate 24 beyond opposite ends of the slot 44, as illustrated in FIGS. 2 and 5. The engagement of the abutments 50 with the support plate 24 by the spring force of the cantilevering detent plate determines the normal position of the detent plate which is illustrated in the drawings.

Two windows or apertures 52 formed in the support plate 24 in alinement with opposite ends of the detent plate 36, as illustrated in FIG. 2, expose adjacent portions of the support elements 32 located within the respective guide sleeves 30.

At opposite ends of the detent plate 36, the horizontally extending section of the detent plate is shaped to define two substantially horizontal detent lips or ledges 54, which normally project through the respective support plate windows 52 toward the adjustable support rods or elements 32. For this purpose, the lips 54 are shaped and dimensioned to extend limited distances horizontally beyond the adjacent abutments 50 which normally engage the support plate.

By virtue of the engagement of the abutments 50 with the support plate 24, as described, the projecting edges of the detent lips 54 are stopped short of radial engagement with the bodies of the elongated support rods or elements 32. The spring force of the cantilevering plate 36 moves the detent lips 54 into interfering relation with flat annular abutment surfaces 56 formed on the support rods 32 and facing upwardly in generally perpendicular relation to the axes of the respective rods, as best illustrated in FIGS. 2 and 4.

A longitudinal series of closely spaced annular abutment surfaces 56 is defined on each rod 32 by a plurality of closely spaced annular shoulders 58 formed on the rod. The shoulders 58 are not connected with each other and are separated by a corresponding series of disconnected circular grooves 60 machined or otherwise formed in the coacting rod. Shaping of the rod to produce the series of circular grooves 60 also forms the corresponding series of shoulders 58 which define the flat annular abutment surfaces 56 described. The series of disconnected abutment surfaces 56 thus formed extends longitudinally along a rather extensive medial portion of each support rod 32.

It should be observed with reference to FIG. 4 that the underside of each shoulder 58 has a generally conical shape which causes the width of each individual groove 60 to increase in a radially outward direction. The effect of this is to maximize the strength of the shoulders 58, while at the same time maximizing the width of the radially outer extremities of the grooves 60 in a construction in which the adjacent abutment surfaces 56 are closely spaced in relation to each other. As will presently appear, this is of advantage in providing a fine adjustment of the positions of the support elements 32, while at the same time facilitating entry of the detent lips 54 into the grooves 60 of the respective support elements.

Normally, each detent lip 54 projects into an adjacent groove 60 in the coacting support element 32 where the detent lip is stopped short of engagement with the bottom of the groove in a position in which it is in interfering relation to upward movement of the adjacent abutment surface 56. The projector supporting forces on the support rods 32 tend to move the rods upwardly. These forces are transmitted to the projector through the positive abutting engagement of flat abutment surfaces 56 with the respective detent lips 54 which are substantially parallel to the coating abutment surfaces. Because of this relationship of the flat abutment surfaces 56 to the coacting detent lips 54, the forces transmitted between the detent lips and the coacting abutment surfaces do not tend substantially to displace the detent lips out of interfering engagement with the coacting abutment surfaces. The result is to positively lock the support rods 32 against upward movement to provide positive firm support to the projector.

As previously intimated, vertical registration of the image projected by the projector with a coacting screen (not shown) is effected by tipping the projector about the rear support feet or elements 20. At this time, both support rods 32 are released to automatically seek the proper positions of vertical adjustment within the guide sleeves 30 for supporting the projector in any position to which it is adjusted. This release of the support rods is effected by actuation of a single control tab or release actuator 48, previously mentioned.

As shown in FIGS. 1, 3 and 6, the release tab or actuator 48 is formed by a flat generally horizontal plastic element which is secured by rivets 62 to the anchor element 46 on the detent plate 36, as shown in FIG. 3. It will be noted that the generally vertical segment of the detent plate 36 is located on and secured to the side of the support plate 24 which confronts the forward panel or wall 64 of the housing 12, as illustrated in FIG. 3.

From its attachment to the actuator anchoring portion 46 of the detent plate 36, the release actuator 48 projects forwardly through an opening 66 in the housing wall 64 into overlying relation to a housing lift element 68 integrally formed on the housing to project forwardly of the housing panel 64, as shown. In this instance, the lift element 68 has an upwardly open channel-like shape which receives the forwardly projecting portion of the release tab or actuator 48.

When adjusting the projector, the user grasps the lift element 68 to support the weight of the forward end of the projector and applies finger pressure to the release actuator 48 which swings the upwardly cantilevering portion of the detent plate 36 in the clockwise direction, as viewed in FIG. 3, to swing the detent lips 54 out of interfering relation with the abutment surfaces 56. The support rods 32 then slide freely within the sleeves 30 to continuously engage the underlying surface 18. The two rods 32 move independently of each other to compensate for any unevenness in the underlying support surface 18. To hold the projector in any position of adjustment, the operator merely releases finger pressure from the release actuator 48, whereupon the detent lips 54 automatically swing into adjacent support rod grooves 60 to positively lock the support rods against upward movement, as described.

By virtue of the positive locking relationship of the detent lips with the coacting abutment surfaces, the positive support provided to the projector has a dependability and effectiveness which is not diminished by usage.

Although a circular rod or support element has been shown, it will be apparent that other shapes such as square, hexagonal, etc. could be used. Further, the disconnected annular grooves could be formed as a continuous thread to allow fine adjustment by rotation of a circular support element. This would not be an ordinary screw thread since the groove shape shown would be retained.

The provision of a simple spring member to lock two support members is important. Should a spring somehow be warped or otherwise tend to move non-symmetrically away from locking position, the first part to move away would engage the projector wall, and the remainder of the spring member would thereafter pivot about this point of engagement quickly to move out of locking position.

The adjustable projector supporting structure is inherently well adapted for extremely economical manufacture on a mass production basis.

The invention is claimed as follows:

1. In a portable picture projector, the combination of a housing, picture projecting means in said housing, support means mounted from said housing defining a pair of laterally spaced support element guides in a common vertical plane, a pair of elongated support elements guided by said guides for vertical adjustment with respect to said housing and extending downwardly to provide adjustable support for the housing, each of said support elements being formed to provide a series of disconnected annular grooves closely spaced longitudinally along the support element and defining upwardly facing substantially horizontal abutment surfaces disposed at a generally perpendicular angle to the axis of the support element, a single resilient detent plate secured to said support means substantially parallel to said common vertical plane and having substantially right angularly disposed lip means thereon in a common substantially horizontal plane and extending into interfering relation with said upwardly facing abutment surfaces of both of said support elements to enable said support elements to carry a part of the weight of said projector, and manually operable lever means operatively connected to said detent plate for resiliently deforming said detent plate temporarily to withdraw said lip means from interfering relation with said abutment surfaces to permit vertical adjustment of said support elements.

2. The combination set forth in claim 1 wherein said lever means comprises a handle rigidly secured to said detent plate.

3. The combination set forth in claim 1 wherein said detent plate is resilient substantially perpendicular to said common vertical plane and is rigid substantially parallel to said plane.

References Cited in the file of this patent
UNITED STATES PATENTS

| | | |
|---|---|---|
| 320,487 | Matthie | June 23, 1885 |
| 1,014,393 | Hermann | Jan. 9, 1912 |
| 2,944,776 | Pester | July 12, 1960 |